Sept. 7, 1943.　　　　J. MARTIN　　　　2,328,988
QUICK RELEASE CONTROL ROD
Filed March 9, 1942

Inventor
JAMES MARTIN
per Rayner &co
Attorneys

Patented Sept. 7, 1943

2,328,988

UNITED STATES PATENT OFFICE 2,328,988

QUICK RELEASE CONTROL ROD

James Martin, Higher Denham, near Uxbridge, England

Application March 9, 1942, Serial No. 434,016
In Great Britain June 24, 1941

3 Claims. (Cl. 287—119)

This invention relates to controls on aircraft and for analogous purposes where it is required to be able to effect a quick separation and connection whilst ensuring a positive joint free from lost motion or play. The invention is particularly useful in connection with push-pull or other remote control devices of aircraft engines, e. g. throttle and like control rods which pass into boxes or through bulkheads, panels and frame members, where it is frequently necessary to be able to remove the engine and bulkhead or the like intact whilst leaving the control rods in a condition ready for re-connection when replacing the engine without upsetting the adjustment of the control or of the part controlled.

In carrying one form of this invention into practice a joint or coupling for a control rod or the like has one end of a rod section formed with a co-axial socket and the other rod section is provided with a spigot or plug end shaped to fit snugly in the socket, the socket being formed with diametrical or transverse apertures adapted to register to form a hole through which is passed a coupling pin fitting the hole closely. This pin is formed with a head which abuts against the perimeter of the socket and is also circumferentially recessed to receive one end of a spring loaded sleeve slidable axially on the plug. The spring is a coiled spring surrounding the plug and interposed between an annular ledge inside the sleeve and an annular shoulder where the plug is increased in diameter to receive the sleeve. By this means the sleeve locks the pin against removal. If it is required to break the joint the sleeve is retracted against the influence of the spring and the pin is withdrawn. It is preferred to form a bayonet joint slot in the end of the sleeve remote from the said locking pin and to engage in such slot a pin projecting from the enlarged end of the plug so that the sleeve can be held in the retracted position whilst removing and replacing the locking pin. Each control rod engages at one end with a lever mounted on a shaft engaged in bearings in the wall of a control box supported by the engine bulkhead. These shafts pass through the wall of the control box and are suitably coupled to the part to be controlled. When the coupling is released, the engine, bulkhead, control box and the part of the control rods connected thereto may be demounted as a unit without disturbing the adjustment of the controls.

In order that this invention may be clearly understood and readily carried into effect a drawing is appended hereto illustrating an embodiment thereof, and wherein, Fig. 1 is a sectional side elevation showing the joint or coupling applied to a push-pull rod of a throttle or like control of an aircraft engine.

Figure 1:
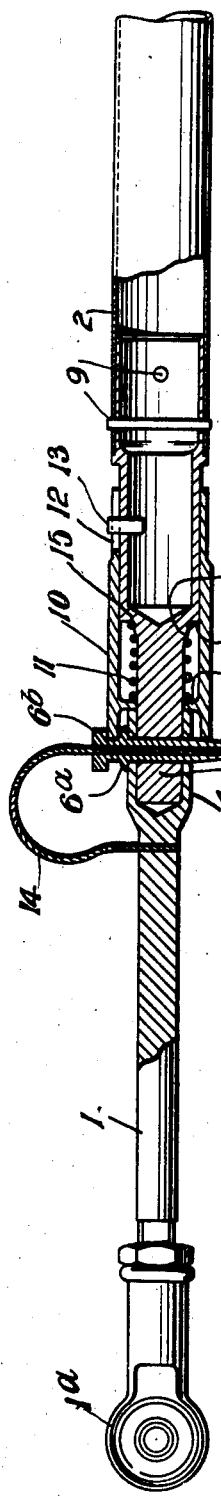
Figure 2:
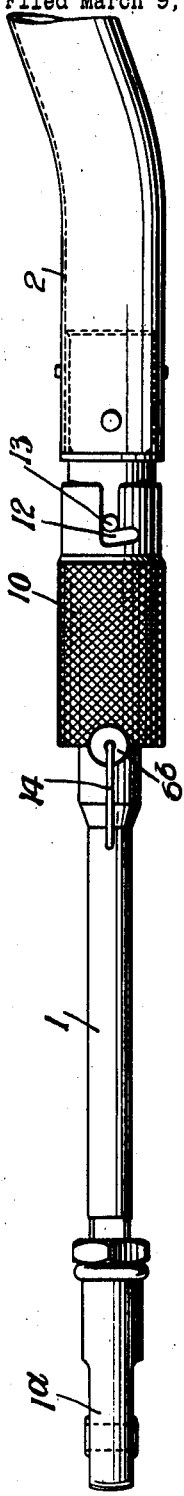
Fig. 2 is a plan view of Fig. 1.
Figure 3:
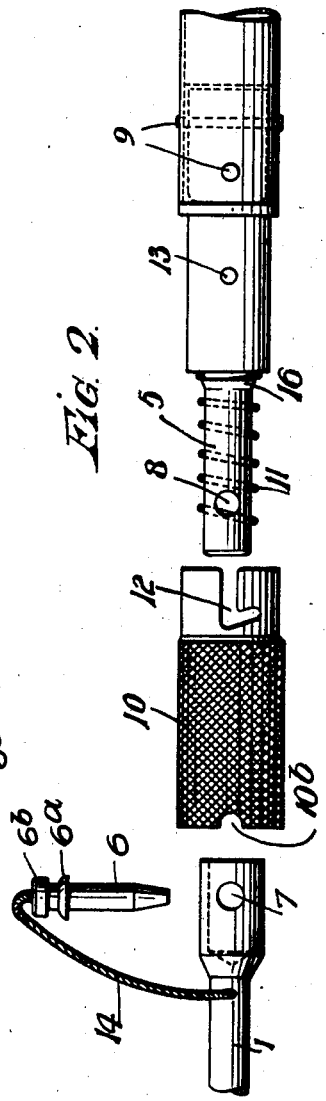
Fig. 3 is a plan view showing the joint or coupling elements separated.

Referring to the drawing the two rod sections to be coupled comprise a member 1 adapted to be connected by a head 1a to a throttle lever or the like, and a member 2 extending to the throttle control lever or equivalent member. The rod section 1 is adapted to pass into a throttle control box on an engine bulkhead so that when the joint or coupling is broken the rod section 1 will remain intact with the appropriate lever of the throttle control and can be removed with the bulkhead, whilst the rod section 2 will remain in its normal position ready for re-connection of the member 1 thereto. The joint or coupling is of such a nature as to ensure accurate re-connection and to obviate play and lost motion between the two rod sections.

The joint or coupling comprises a cylindrical socket 4 on the end of the rod section 1 remote from the head 1a, and a plug 5 shaped to fit snugly in the socket 4, this plug and the socket 4 when fully engaged receiving a locking pin 6 diametrically through the inter-engaged plug and socket, for which purpose the socket has a pair of opposed holes 7 and the plug a diametrically disposed hole 8 which registers with the holes 7.

The plug 5 is fitted at one end in the appropriate end of the rod section 2 as a plug fit and is secured by pins 9 or other suitable means. This end of the plug is of larger diameter than the end which fits into the socket 4 and slidably supports a sleeve 10 which normally locks the pin 6 against removal. For this purpose the sleeve 10 is urged towards the free end of the plug 4 by a coiled compression spring 11 interposed between the annular shoulder 5a at the junction of the wide and narrow parts of the plug and an annular rib 10a projecting inwardly from the sleeve 10. This forward spring pressure on the sleeve 10 engages the leading end of the sleeve over a flange 6a on a milled head 6b of the locking pin 6 so that the locking pin is secured against removal. The end of the sleeve 10 is formed with a recess 10b to enable it to engage further over the flange 6a.

In order to break the joint or coupling the sleeve 10 is retracted against the influence of the spring 11 to disengage the sleeve from the flange 6a whereupon the pin 6 can be removed and the socket 4 pulled from the plug 5. To facilitate this operation and also to retain the sleeve 10 ready for a quick re-connection of the joint, the inner or rear end of the sleeve is formed with a bayonet joint slot 12 in which engages a pin 13 fixed in the plug 5. When the joint is to be broken, the sleeve is pressed back against the spring 11, until the cross end of the slot 12 comes in line with the pin 13. The sleeve is given a slight twist to engage the cross end of the slot with the pin 13 so as to hold the sleeve in the fully retracted position. The locking pin 6 can then be withdrawn and replaced. A slight twist of the sleeve will release it and the spring 11 will re-engage it in the locking position.

To ensure the locking pin being always accessible for re-connecting the joint parts it is preferably permanently anchored to the appropriate joint element by a wire 14, and to prevent the spring 11 from flying loose its inner end is sprung into a circumferential recess 15 in a flared inner end 16 of the smaller diameter part of the plug 5.

It will be apparent that by means of the present invention it is unnecessary to have to manipulate threaded members and joints which are not conveniently accessible in order to make or break a joint in a control rod, this advantage being very useful in aircraft maintenance. Also it will be evident that the breaking and re-connection of the joint always ensures an accurate relationship of control rod and throttle or other controlled member and that a positive and solid coupling is effected. The pin 6 being a close fit in the aperture 7 and 8 is tapered at its entry end as at 6c to facilitate its insertion, this taper clearing the socket 4 when the joint is completed so that it does not prevent a completely close fit of the locking pin in the said holes. The larger diameter or inner end of the plug 5 can if desired comprise part of the rod section 2 and the pin 13 can be in the rod section 2. The nature of the joint enables a number of control rods to be assembled in juxtaposition to each other, without impeding the operation of making and breaking each joint, this being advantageous with an aircraft engine control box or the like in which a number of closely related levers are mounted on separate shafts in a shallow box projecting from the bulkhead into the engine bay. The control rod assembly is intended to be used for a push-pull rod, but the invention is equally applicable to a rod adapted to be turned or rotated about its axis, and consequently the joint can be standardised for a large number of control devices.

I claim:

1. A readily releasable coupling or joint for an engine or other control rod for aircraft or the like comprising a plug member adapted to form one end of a rod section or the like, a socketed member adapted to form one end of another rod or like section and adapted to receive the plug member as a close fit, a locking pin, apertures in the plug member and socketed member adapted to register to receive said pin, a sleeve encircling said plug member, an abutment inside said sleeve and upon said plug member, a coiled compression spring interposed between said abutments, said sleeve extending at one end beyond its said internal abutment to engage said locking pin, and means at the other end of said sleeve to lock it in the retracted position.

2. A readily releasable coupling or joint for an engine or other control rod for aircraft or the like comprising a plug member adapted to form one end of a rod section or the like, a socketed member adapted to form one end of another rod or like section and adapted to receive the plug member as a close fit, a locking pin, apertures in the plug member and socketed member adapted to register to receive said pin, a locking recess in one end of said pin, a sleeve encircling said plug member, an abutment inside said sleeve and upon said plug member, a coiled compression spring interposed between said abutments, said sleeve extending at one end beyond its said internal abutment to engage in said recess in the locking pin, a bayonet joint slot in the other end of said sleeve and a projection on said plug member to engage in said slot to lock the sleeve in its retracted position.

3. A readily releasable mechanical joint comprising, in combination, rods having interengaging ends, an aperture in each of said rods which apertures are in registry when the rods are brought into interengaging relationship, a removable locking pin adapted to be passed through said apertures to couple the rods together, said pin having a locking recess in one end thereof, an elongated sleeve axially slidable over one of said rods, an axially compressible spring engaging said sleeve and one of said rods and enclosed by said sleeve, and adapted to urge said sleeve to a position overlying said apertures when in registry, whereby said sleeve is adapted to be forced into the locking recess of the pin to prevent removal of said pin.

JAMES MARTIN.